United States Patent
D'Amico et al.

(10) Patent No.: US 9,817,649 B2
(45) Date of Patent: Nov. 14, 2017

(54) INSTALLATION OF SOFTWARE APPLICATIONS ON MOBILE DEVICES BASED ON POSITIONS THEREOF

(71) Applicant: International Business Machines Corporation, Armonk, NY (US)

(72) Inventors: Alessio D'Amico, Rome (IT); Filomena Ferrara, Rome (IT); Fabrizio Loppini, Rome (IT); Marco Morucci, Rome (IT); Roberto Ragusa, Lucera (IT)

(73) Assignee: International Business Machines Corporation, Armonk, NY (US)

( * ) Notice: Subject to any disclaimer, the term of this patent is extended or adjusted under 35 U.S.C. 154(b) by 106 days.

(21) Appl. No.: 14/730,045

(22) Filed: Jun. 3, 2015

(65) Prior Publication Data

US 2015/0378709 A1    Dec. 31, 2015

(30) Foreign Application Priority Data

Jun. 27, 2014    (GB) .................................. 1411473.0

(51) Int. Cl.
  *G06F 9/445*    (2006.01)
  *H04W 8/08*    (2009.01)
  *H04W 4/00*    (2009.01)

(52) U.S. Cl.
  CPC ................. *G06F 8/62* (2013.01); *G06F 8/61* (2013.01); *H04W 4/001* (2013.01); *H04W 8/08* (2013.01)

(58) Field of Classification Search
  None
  See application file for complete search history.

(56) References Cited

U.S. PATENT DOCUMENTS 6,496,979 B1 *  12/2002  Chen ........................ G06F 8/61
                                                      717/178
7,487,499 B2    2/2009   Gatz
(Continued)

FOREIGN PATENT DOCUMENTS

EE    WO 2009056148 A2 *  5/2009    ......... H04L 41/0883
EP    1538859 B1    1/2008
(Continued)

OTHER PUBLICATIONS

Guarino, Sarah. "iOS 7 How-to: Set up Automatic App Updates." 9to5mac, Sep. 20, 2013, 9to5mac.com/2013/09/20/ios-7-how-to-set-up-automatic-app-updates/. Accessed Nov. 7, 2016.*
(Continued)

*Primary Examiner* — Qing Chen
*Assistant Examiner* — Binh Luu
(74) *Attorney, Agent, or Firm* — Yee & Associates, P.C.; David Zwick

(57) ABSTRACT

A solution for installing software applications on a mobile computing device is proposed. A corresponding method comprises monitoring a position of the mobile computing device, selecting one or more software applications available to be installed on the mobile computing device according to the position of the mobile computing device, and installing the selected software applications in a container of the mobile computing device providing an execution environment for the selected software applications with controlled access to one or more resources of the mobile computing device.

14 Claims, 6 Drawing Sheets

(56) References Cited

U.S. PATENT DOCUMENTS

| | | | |
|---|---|---|---|
| 8,549,656 | B2 | 10/2013 | Blaisdell et al. |
| 8,588,819 | B2 | 11/2013 | Issa et al. |
| 2009/0300595 | A1* | 12/2009 | Moran .................. G06F 8/65 717/170 |
| 2010/0031249 | A1* | 2/2010 | Baliga ................. G06Q 10/06 717/174 |
| 2010/0120450 | A1 | 5/2010 | Herz |
| 2010/0312966 | A1 | 12/2010 | De Atley et al. |
| 2012/0246630 | A1* | 9/2012 | Kuzins .................. G06F 8/61 717/169 |
| 2013/0005360 | A1 | 1/2013 | Issa et al. |
| 2013/0055378 | A1 | 2/2013 | Chang et al. |
| 2013/0210404 | A1 | 8/2013 | Curtis |
| 2013/0304608 | A1 | 11/2013 | Mehta et al. |
| 2013/0326499 | A1* | 12/2013 | Mowatt .................. G06F 8/60 717/177 |
| 2013/0339937 | A1* | 12/2013 | Meggison, Sr. .......... G06F 8/62 717/168 |
| 2014/0075430 | A1* | 3/2014 | Zheng .................. G06F 8/62 717/174 |
| 2014/0108793 | A1* | 4/2014 | Barton ............... G06F 21/6218 713/165 |
| 2014/0201681 | A1* | 7/2014 | Mahaffey .......... H04M 1/72569 715/846 |
| 2014/0250433 | A1* | 9/2014 | Stekkelpak ............... G06F 8/61 717/176 |
| 2014/0344804 | A1* | 11/2014 | Ein-Gal .................. G06F 8/61 717/178 |
| 2015/0089673 | A1* | 3/2015 | Beckman ............. H04L 63/105 726/29 |
| 2017/0063722 | A1* | 3/2017 | Cropper ................ H04L 47/82 |
| 2017/0093923 | A1* | 3/2017 | Duan .................... H04L 63/20 |
| 2017/0161676 | A1* | 6/2017 | Aji ...................... G06Q 10/087 |

FOREIGN PATENT DOCUMENTS

| | | |
|---|---|---|
| EP | 2186305 B1 | 9/2013 |
| WO | WO2013025382 A1 | 2/2013 |
| WO | WO2013142722 A1 | 9/2013 |
| WO | WO2013147725 A1 | 10/2013 |

OTHER PUBLICATIONS

Android, "Android Developers Security Tips." Android Developers, Mar. 2, 2013, web.archive.org/web/20130302014754/https://developer.android.com/training/articles/security-tips.html. Accessed Jun. 5, 2017.*

H, Victor. "How to stop Android apps from accessing your sensitive private data (hint: revoke permissions)." Phone Area, Dec. 30, 2013, www.phonearena.com/news/How-to-stop-Android-apps-from-accessing-your-sensitive-private-data-hint-revoke-permissions_id50744.*

Intellectual Property Office Search Report, dated Dec. 10, 2014, regarding Application No. GB1411473.0, 5 pages.

"Android Security Overview", Google, Inc., copyright 2013, 13 pages. http://source.android.com/devices/tech/security/.

Aalto et al., "Bluetooth and WAP Push Based Location-Aware Mobile Advertising System," The Second International Conference on Mobile Systems, Applications, and Services (MobiSYS '04), Jun. 2004, 10 pages.

de Reyck et al., "Broadcast Scheduling for Mobile Advertising," Operations Research, vol. 51, No. 4, Jul.-Aug. 2003, pp. 509-517.

Wu et al., "Design and Development of a Location-Based Advertising and Recommending System," The 8th International Conference on Knowledge Management in Organizations, Sep. 2013, pp. 341-346.

* cited by examiner

INSTALLATION OF SOFTWARE APPLICATIONS ON MOBILE DEVICES BASED ON POSITIONS THEREOF

CROSS-REFERENCE TO RELATED APPLICATION(S)

This application claims the benefit of priority to United Kingdom Patent Application No. GB 1411473.0, filed Jun. 27, 2014, the entire contents of which are incorporated herein by reference.

TECHNICAL FIELD

The present disclosure relates to the data processing field. More specifically, this disclosure relates to mobile computing devices.

BACKGROUND

Mobile computing devices (or simply mobile devices), such as smart-phones and tablets, may be used to run a number of mobile software applications, also known as (mobile) apps. The apps may be of different types; particularly, the usefulness of some apps is strictly linked to specific locations (for example, apps providing time tables at bus/train stations, visiting guides at museums, shopping offers at malls).

However, users of the mobile devices may be unaware of the availability of apps designed to help them at their current positions. In any case, the operations required to find, download and install these apps are time consuming and bothersome; moreover, sometimes the apps are to be downloaded in advance (for example, when an inexpensive network connection is not available locally).

Several techniques have been proposed to facilitate the automatic installation/removal of apps depending on the positions of the mobile devices.

For example, US-A-2013/0210404 (the entire disclosure of which is herein incorporated by reference) discloses a system comprising a wireless access device operatively coupled to an application server system deployed at a location associated with an entity; the application server and the wireless access device cooperate to wirelessly download a temporary application to a mobile device when it is located within an application support area of the entity, which temporary application is configured to be installed and executed at the mobile device when it is located within the application support area and to be automatically disabled or uninstalled from the mobile device when the mobile device leaves the application support area.

U.S. Pat. No. 8,588,819 (the entire disclosure of which is herein incorporated by reference) discloses a mobile device that obtains a list of applications associated with a current or anticipated location of the mobile device from a centralized or distributed application; the mobile device activates desired applications that are selected either manually or automatically from the list associated with the location of the mobile device, which desired applications may be deactivated once one or more deactivation criteria are satisfied.

US-A-2013/0304628 (the entire disclosure of which is herein incorporated by reference) discloses a system that receives data referencing a location of a mobile device, selects applications that are relevant to the location, and provides a recommendation to the mobile device identifying these applications.

US-A-2010/0120450 (the entire disclosure of which is herein incorporated by reference) discloses communicating location information associated with a mobile device to a server; content identified by the server (including an application associated with the location information) is received at the device, and it is displayed on the device only while the device is at or near a particular location identified by the location information.

WO-A-2013/025382 (the entire disclosure of which is herein incorporated by reference) discloses an architecture wherein, given a location registered to a service, the service may suggest installing a new application relevant to the location onto application-driven devices (e.g., cell phones).

EP-B-2186305 (the entire disclosure of which is herein incorporated by reference) discloses a portable electronic device that determines a current position thereof and provides it to a server; the portable electronic device then receives a link to an application from the server responsive to the provided current position and downloads it if the current position of the portable electronic device is within an associated region.

However, the installation of the apps on the mobile devices according to their positions may involve security, privacy and performance concerns.

Particularly, the installation of each app generally requires that users of the mobile devices should explicitly authorize the app to access specific resources of the mobile devices (such as system configurations and personal data); this operation may be bothersome for the users and prone to errors, especially when it has to be performed continually (with the risk of causing corresponding privacy or security exposures).

Similar considerations apply to the remote transmission of contextual information of the mobile devices (for example, their positions and characteristics) to central systems that select the apps to be installed thereon; indeed, this exposes the mobile devices to the risk of sniffing of the corresponding contextual information.

In addition, the installation of the apps on the mobile devices according to their positions may cause an overload thereof, with a degradation of the other functionalities of the mobile devices.

Likewise, the continual transmission of the contextual information of the mobile devices to the central systems increases a power consumption of the mobile devices (thereby reducing their battery life), and it increase a workload of the central systems and a traffic on corresponding communication networks (with a risk of congestions thereof).

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of controlling an access to resources of the mobile computing device.

Particularly, an aspect provides a method for installing software applications on a mobile computing device, wherein the software applications are selected according to a position of the mobile computing device, and they are installed in a container providing an execution environment with controlled access to one or more resources of the mobile computing device.

A further aspect provides a computer program for implementing the method (and a corresponding computer program product).

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

With reference in particular to FIG. 1A-FIG. 1D, an exemplary application is shown of the solution according to an embodiment of the present disclosure.

Figure 1A:
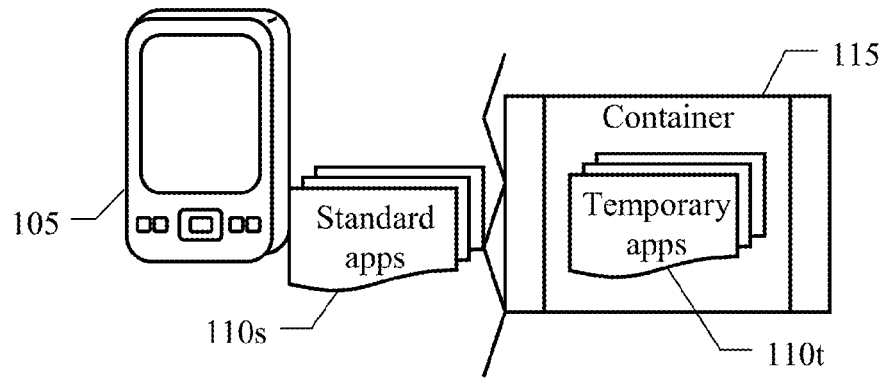
FIG. 1A-FIG. 1D show an exemplary application of the solution according to an embodiment of the present disclosure.

Starting from FIG. 1A, a mobile (computing) device 105 (for example, a smart-phone or a tablet) is designed to be transported by a user thereof during its normal operation; therefore, the mobile device 105 is generally supplied by battery, it is quite small and light, and it supports wireless connectivity. The mobile device 105 may be used to perform a number of functions by a user thereof (while s/he moves). For this purpose, corresponding apps (i.e., mobile software applications) are installed on the mobile device 105. Particularly, some apps referred to as standard apps 110s are installed as usual (for example, as bundled software or by the user) so as to remain on the mobile device 105 until they are expressly removed (for example, by the user); other apps referred to as temporary apps 110t are instead installed according to a position of the mobile device 105 (as described in the following).

In the solution according to an embodiment of the present disclosure, the temporary apps 110t are installed in a dedicated container (or sandbox) 115 of the mobile device 105; the container 115 provides an (internal) execution environment (for the temporary apps 110t) with controlled access to one or more resources of the mobile device 105. Generally, the containers are used to implement "Bring Your Own Device" (BYOD) policies, wherein employees are allowed use their own mobile devices to access job-related data and to run job-related apps; however, in this case the containers operate as a safe that has the purpose of protecting the (sensitive) internal execution environment (of the job-related data and apps inside the containers) from an external execution environment (by means of a controlled common entry point to the internal execution environment), so as to avoid that any (personal) apps from the external execution environment may access the job-related data and apps in the internal execution environment. Exactly to the contrary, in an embodiment of the present disclosure the container 115 operates like a cage that protects the external execution environment from the internal execution environment (so as to control any access of the temporary apps 110t within the container 115 to the resources of the mobile device outside it).

In this way, any authorizations that are granted to the temporary apps 110t may be controlled together; therefore, the operations that are required by the user are quite easy and less prone to errors (since they may be performed only once for all the temporary apps 110t).

For example, the user may restrict the resources of the mobile device 105 that are accessible by the temporary apps 110t (for example, preventing them to access system functions and personal data); this limits the risk of security exposures (for example, due to the installation of viruses or other harmful code that might damage the mobile device 105) and of privacy exposures (for example, due to the installation of spywares or identity-theft software that may collect personal information of the user).

Moreover, the use of the resources of the mobile device 105 by the temporary apps 110t may be limited (again at once for all of them); therefore, it is possible to reduce the consumption of critical resources of the mobile device 105 (for example, processing power, network bandwidth) by the temporary apps 110t, so as to avoid any risk of degradation of the other functionalities of the mobile device 105.

Figure 1B:
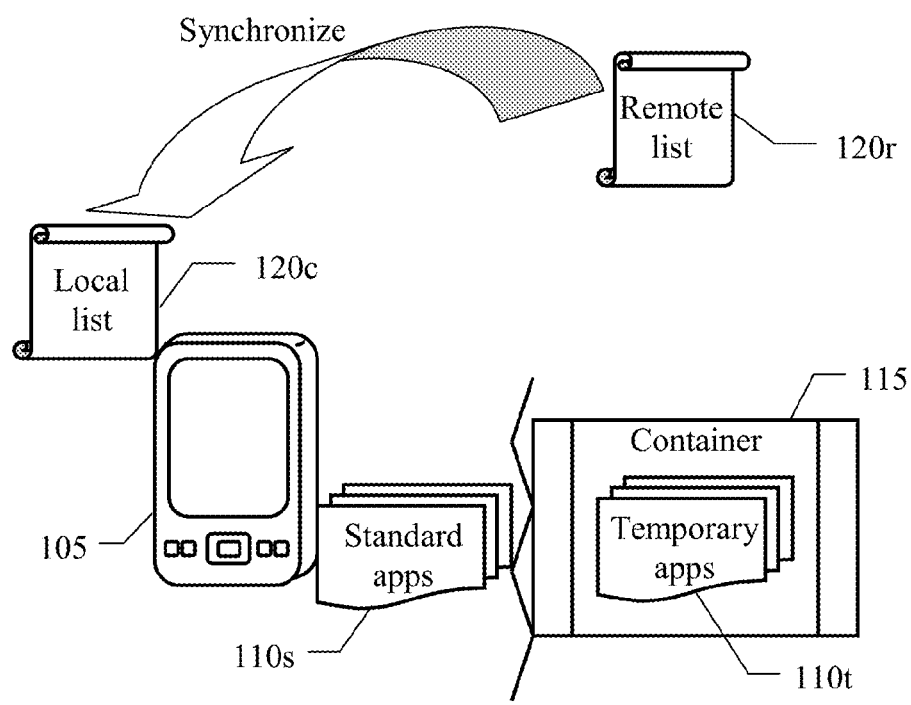

Moving to FIG. 1B, the installation of the temporary apps 110t on the mobile device 105 (in addition or in alternative to occur in the container 115) is controlled by a local list 120c stored in the mobile device 105; for each available app that may be installed on the mobile device 105, the local list 120c comprises an indication of an installation condition that is based on a (current) position of the mobile device 105. The local list 120c is synchronized with a corresponding remote list 120r, or more, stored in corresponding central systems not shown in the figure (for example, by applying database synchronization techniques that are commonly used in disaster recovery scenarios).

Figure 1C:
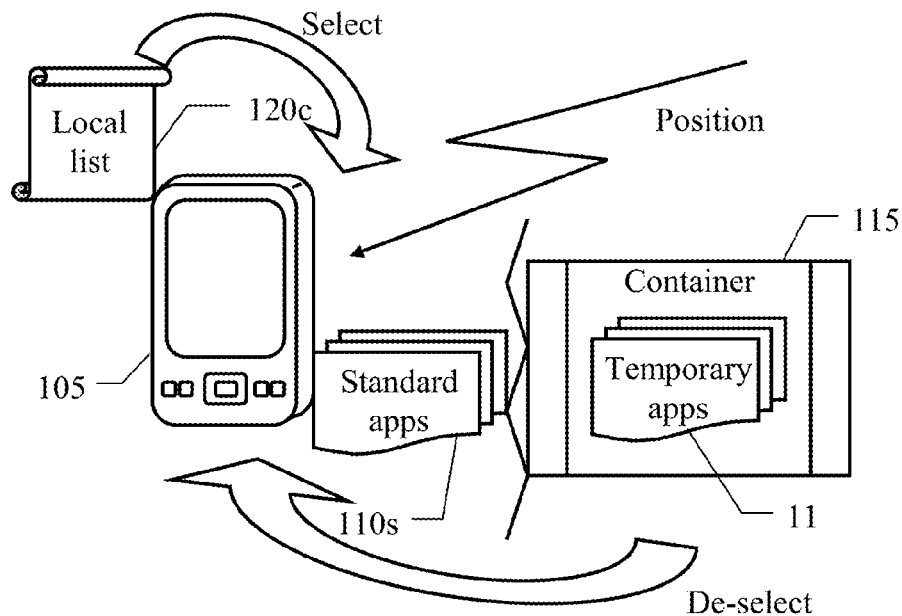

Moving to FIG. 1C, the mobile device 105 monitors its position (for example, by listening for beacon frames or by detecting its GPS coordinates). The available apps whose installation condition, indicated in the local list 120c, is fulfilled by the position of the mobile device 105 are selected (for their installation thereon). At the same time, the temporary apps 110t (already installed on the mobile device 105) whose installation condition is not fulfilled any longer by the position of the mobile device 105 are de-selected.

Figure 1D:
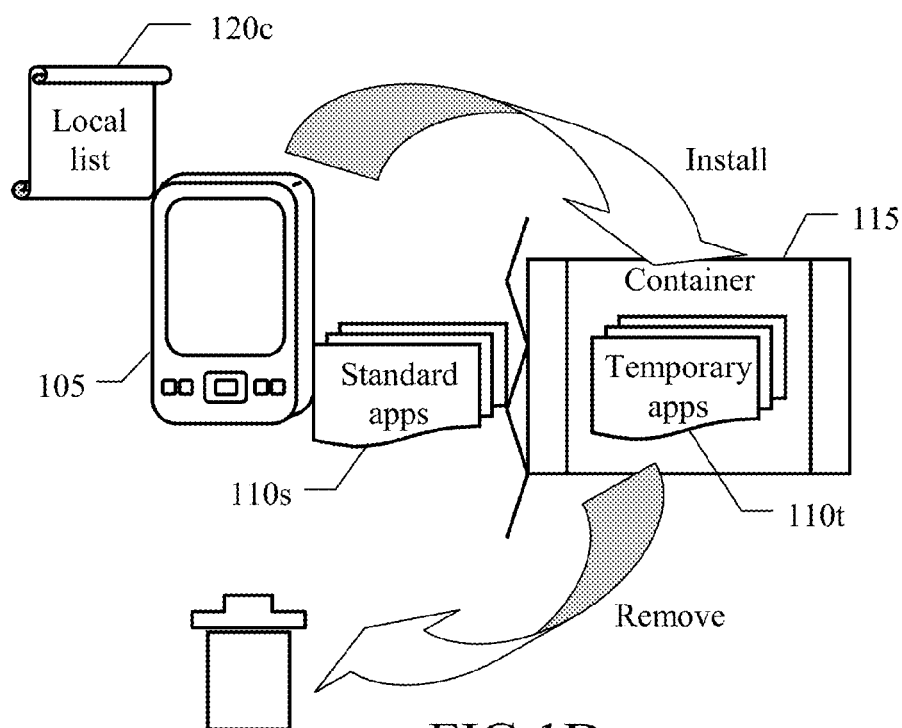

Moving to FIG. 1D, each selected app is installed into the container 115 (so that its access to the resources of the mobile device 105 is automatically controlled accordingly). At the same time, each de-selected temporary app 110t is removed (for example, by disabling and then uninstalling it).

In this way, it is possible to avoid the transmission of contextual information of the mobile device 105 (and particularly its position) remotely, since the selection of the available apps to be installed on the mobile device 105 according to its position is performed locally; therefore, the risk of any sniffing of this contextual information is reduced.

Moreover, this reduces a power consumption of the mobile device 105 (thereby increasing its battery life), and it reduces a workload of the central systems and a traffic on corresponding communication networks (and then the risk of congestions thereof); as a result, this operation may be performed at relatively high frequency, even when intermittent or unreliable network connections are available.

Figure 2:
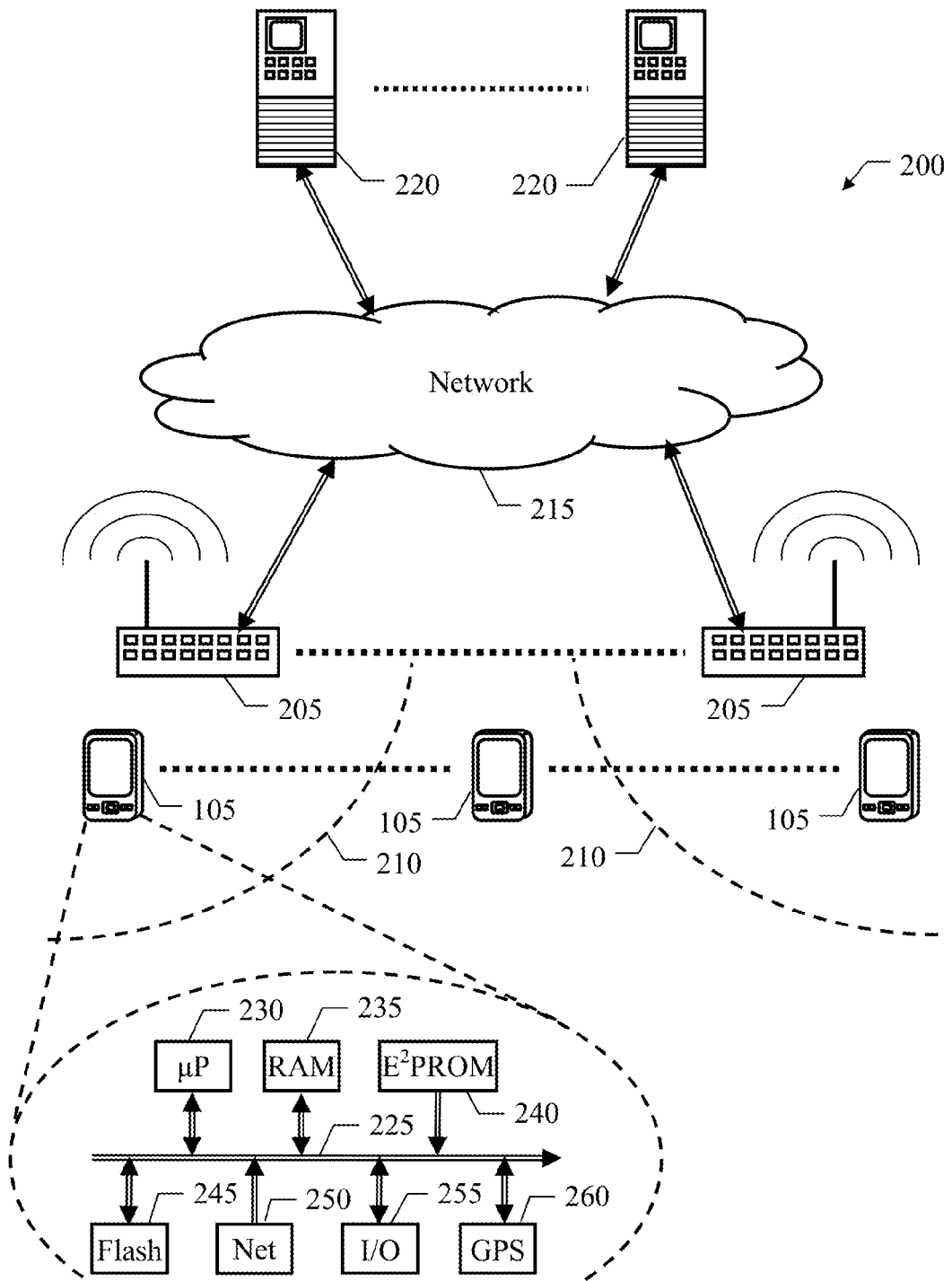
FIG. 2 shows a schematic block-diagram of a computing system wherein the solution according to an embodiment of the present disclosure may be practiced.

With reference now to FIG. 2, a schematic block-diagram is shown of a computing system 200 wherein the solution according to an embodiment of the present disclosure may be practiced.

The (computing) system 200 comprises a number of (wireless network) access points 205, for example, of the Wireless Fidelity (Wi-Fi) type. The access points 205 are used to connect different mobile devices (denoted with the same references 105) within their transmission range 210 into corresponding Wireless Local Area Networks (WLANs), based on the IEEE 802.11 specification in the example at issue. In turn, the access points 205 are connected to the Internet, for example, through a fixed-line telephone network, also known as Public Switched Telephone Network (PSTN), and through it to selected Internet Service Providers (ISPs), not shown in the figure. The Internet is formed by millions of computing machines, which are interconnected through a global communication network 215. Particularly, the Internet comprises one or more installation server computing machines (or simply installation servers) 220, which are used to manage the installation of the temporary apps on the mobile devices 105.

For example, the access points 205 are unprotected so as to allow the connection thereto to any mobile devices 105 (within their transmission ranges 210); particularly, the access points 205 are public (also known as hotspots) so as to allow the connection unconditionally (for free) to the Internet, which connection may be offered by local authorities as a public service (for example, in bus/train stations and airports) or by private establishments as a complementary service to their clients (for example, in museums, malls, parks, hotels, coffee shops, restaurants).

Each mobile device 105 comprises several units that interface through a bus architecture 225. In detail, a microprocessor (μP) 230 controls operation of the mobile device 105; a RAM 235 is used as a working memory by the microprocessor 230, and an EPROM 240 stores a firmware defining operation of the mobile device 105. A flash memory card 245 (for example, of the micro SD type) provides a mass memory for storing programs and data. The mobile device 105 further comprises one or more network adapters 250, for example, a WNIC of the Wi-Fi type for communicating with the access points 205 (and any other access points of the same type, not shown in the figure) and a mobile telephone transceiver (TX/RX) for communicating with a mobile telephone infrastructure (not shown in the figure); the mobile device 105 is also provided with input/output (I/O) units 255 (for example, a touch-screen, command buttons, a loudspeaker and a microphone), and a GPS receiver 260 (for tracking its position).

Figure 3:
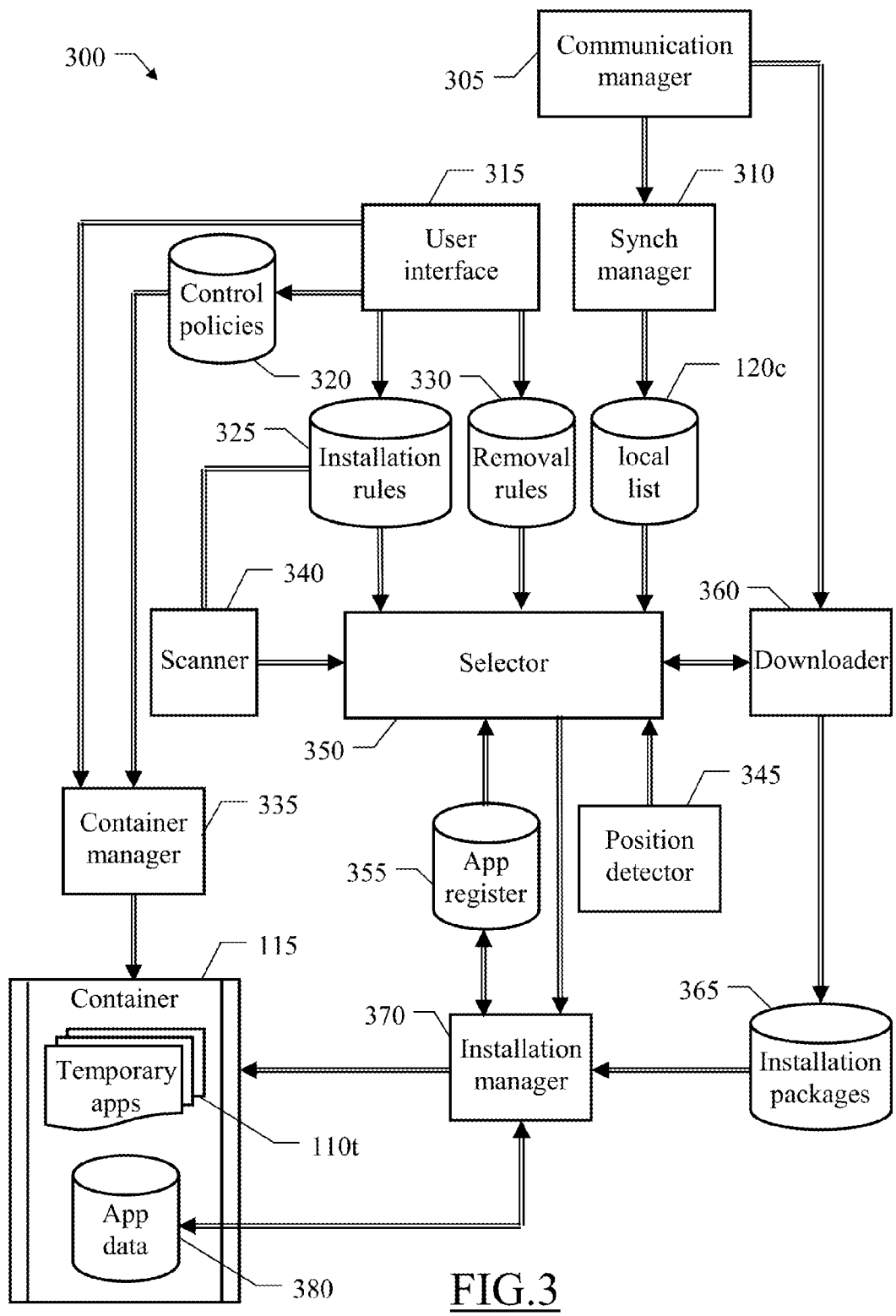
FIG. 3 shows the main software components that may be used to implement the solution according to an embodiment of the present disclosure.

With reference now to FIG. 3, the main software components are shown that may be used to implement the solution according to an embodiment of the present disclosure. Particularly, the software components (programs and data) are denoted as a whole with the reference 300. The software components 300 are typically stored in the mass memory and loaded (at least partially) into the working memory of each mobile device when the programs are running, together with an operating system and other application programs (not shown in the figure). The programs are initially installed into the mass memory, for example, from removable storage units or from the Internet. In this respect, each software component may represent a module, segment or portion of code, which comprises one or more executable instructions for implementing the specified logical function.

Particularly, a communication manager 305 manages any communications supported by the mobile device, for example, of the Wi-Fi type with the access points and of the 2G-4G type with the mobile telephone infrastructure (not shown in the figure). A synchronization manager 310 interfaces with the communication manager 305 for synchronizing the local list 120c with the remote list(s) (for example, stored in one or more installation servers, not shown in the figure). The installation list 120c comprises a record for each app that is available to be installed on the mobile device (identified by a unique identifier thereof). The record comprises an indication of a selection condition for the selection of the app for its installation on the mobile device, which selection condition is based on a (current) position of the mobile device; for example, the selection condition is based on an installation area (or more) defined by the proximity to a corresponding access point or by a maximum distance from specific GPS coordinates; the record further comprises a link (for example, a URL) to a location from which an indication of features of the app and a corresponding installation package may be downloaded.

Moreover, the mobile device exposes a (graphical) user interface 315, which allows the user to configure the mobile device for the installation of the temporary apps.

More specifically, the user may define (i.e., view, create, update or delete) control policies, which are stored in a control policy repository 320. The control policies define a configuration of the container 115 (for the access of its temporary apps 110t to the resources of the mobile device). For example, the control policies may restrict the resources of the mobile device that are accessible by the temporary apps 110t. Particularly, it is possible to prevent the temporary apps 110t to access system functions, for example, direct writing in the working/mass memory (with instead the use of a scratch area thereof), reading of system configurations, invoking of system commands; in addition or in alternative, it is possible to prevent the temporary apps 110t to access personal data, for example, user's address book, calendar, photos. Moreover, the control policies may limit the use of the resources of the mobile device by the temporary apps 110t; for example, it is possible to set a threshold (either in absolute terms or in relative terms with respect to the standard apps) for the usage of the processing power and the network bandwidth.

The user may define installation rules, which are stored in an installation rule repository 325. The installation rules are used to enable the installation of the temporary apps on the mobile device. Particularly, the installation rules may be based on a status of one or more resources of the mobile device, for example, preventing the installation of any temporary apps when its battery level or available mass memory space is (possibly strictly) lower than a threshold (for example, 20-40%). In addition or in alternative, the installation rules may be based on one or more features of the temporary apps, for example, preventing or requiring an explicit authorization for the installation of temporary apps occupying a mass memory space (possibly strictly) higher than a threshold (such as 3-10 Mbytes), preventing the installation of temporary apps comprised in a black list.

The user may define removal rules, which are stored in a removal rule repository 330. The removal rules are used to control the removal of the temporary apps 110t from the mobile device. Particularly, the removal rules may set a disabling interval for disabling the temporary apps 110t after the corresponding installation condition is not fulfilled any longer, and an uninstalling interval for uninstalling the temporary apps 110t after their disabling.

A container manager 335 controls the container 115; for this purpose, the container manager 335 accesses the control policy repository 320 (for retrieving the control policies) and it communicates with the user interface 315 (for receiving a reset command of the container 115 that may be submitted by the user).

A scanner 340 accesses the installation rule repository 325; the scanner 340 is capable of discovering the status of each resource indicated in the installation rules (for example, by reading corresponding system registers or by running corresponding apps). A position detector 345 is used to monitor the position of the mobile device (for example, listening for corresponding beacon frames or by exploiting a GPS service).

A selector 350 selects the apps to be installed on the mobile device. For this purpose, the selector 350 accesses the local list 120c (to retrieve the apps that are available to be selected with the corresponding installation conditions) and the position detector 345 (to retrieve the position of the mobile device for verifying the installation conditions against it); moreover, the selector 350 accesses the installation rule repository 325 (to retrieve the installation rules) and the scanner 340 (to retrieve the status of the resources to be verified against the installation rules). The selector 350 further de-selects the temporary apps to be removed from the mobile device. For this purpose, the selector 350 accesses an app register 355 storing an indication of all the (standard/temporary) apps that are installed on the mobile device, and the removal rule repository 330 (for retrieving the removal rules to be applied).

The selector 350 controls a downloader 360, which interfaces with the communication manager 305 (for downloading the features of the apps to be verified against the installation rules and the installation packages of the apps to be installed); the downloaded installation packages are stored in an installation package repository 365. The selector 350 further controls an installation manager 370, which in turn controls the installation/removal of the temporary apps 110t in the container 115. For this purpose, the installation manager 370 accesses the installation package repository 365 and it controls the app register 355; the installation manager 370 further controls an app data repository 380 stored within the container 115; the app data repository 380 saves app data of the temporary apps that have been de-selected and possibly removed, and particularly a de-selection time-stamp (indicating when the temporary app has been de-selected) and user's data of the temporary app (for example, a shopping cart or a wish list).

Figure 4A:
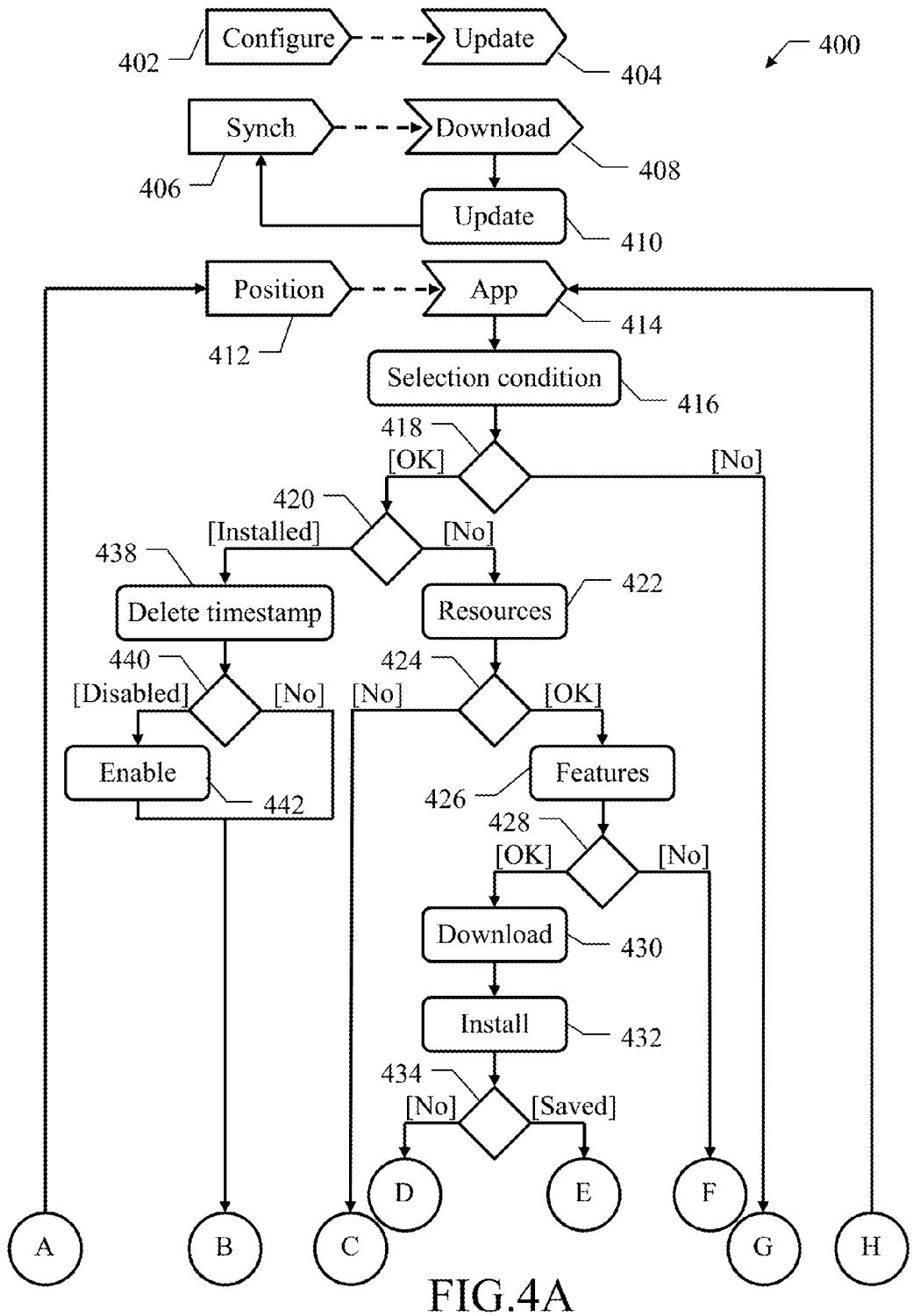
FIG. 4A-FIG. 4B show an activity diagram describing the flow of activities relating to an implementation of the solution according to an embodiment of the present disclosure.
Figure 4B:
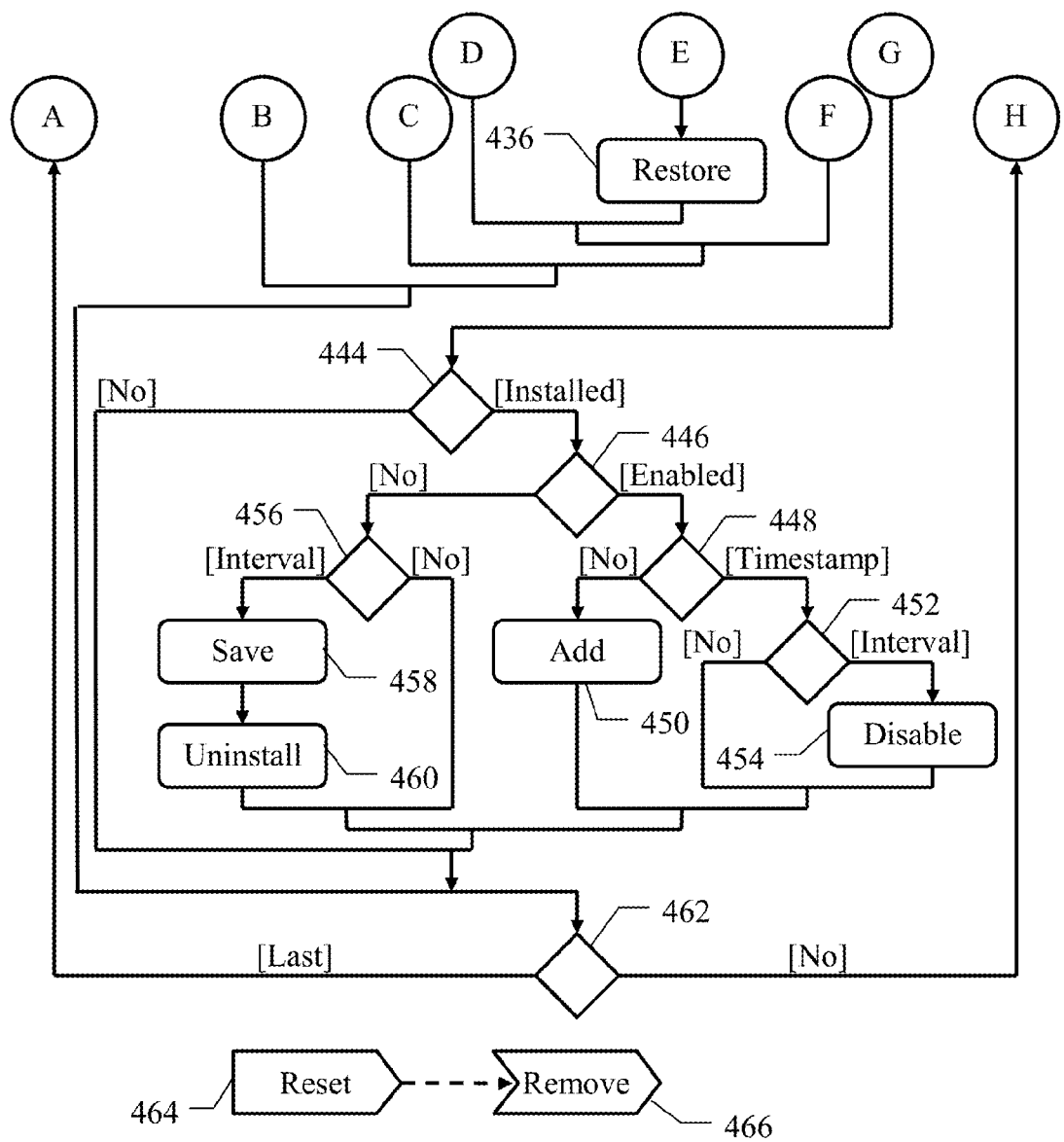

With reference now to FIG. 4A-FIG. 4B, an activity diagram is shown describing the flow of activities relating to an implementation of the solution according to an embodiment of the present disclosure. Particularly, the activity diagram represents an exemplary process that may be used to control the installation of the temporary apps with a method 400. In this respect, each block may represent one or more executable instructions for implementing the specified logical function on the mobile device.

Particularly, the flow of activity enters block 402 whenever the user of the mobile device wishes to change its configuration as far as the installation of the temporary apps is concerned, i.e., the control policies, the installation rules and/or the removal rules (by submitting corresponding commands through the user interface). In response thereto, the corresponding repositories are updated accordingly at block 404; moreover, when the configuration changes relate to the control policies corresponding authorizations of the container (controlling its access to the resources of the mobile device, and particularly preventing the mobile device to access them or limiting their use) are further updated.

In a completely independent way, the flow of activity enters block 406 whenever a synchronization of the local list with each corresponding remote list is triggered; for example, the mobile device submits a synchronization request to the installation server periodically (such as every 10-60 s), by passing an identifier of a current version of the local list. If a newer version of the remote list is available on the installation server, the mobile device at block 408 downloads a corresponding delta package (comprising their differences and instructions for the application thereof to the local list). The delta package is then applied to the local list at block 410 so as to update it accordingly (i.e., by adding, changing or deleting corresponding records). The flow of activity then returns to the block 406 waiting for a next triggering of the synchronization of the local list.

Again in a completely independent way, the flow of activity enters block 412 whenever the detection of the (current) position of the mobile device is triggered. For example, the mobile device may be listening for beacon frames that are broadcast by the access points (so as to set its position in proximity to every access point whenever the corresponding beacon frame is received); in addition or in alternative, the mobile device may retrieve its GPS coordinates periodically (for example, every 1-20 s). If the position of the mobile device has changed significantly with respect to a previous value thereof (for example, when the mobile device is in proximity of different access points or when the GPS coordinates of the mobile device have changed by more that 50-100 m), a loop is performed for processing the (available) apps indicated in the local list.

The loop begins at block 414, wherein the apps of the local list are scanned in succession (starting from the first one). The selection condition of the (current) app is retrieved at block 416 from the local list. Continuing to block 418, the selection condition is verified against the position of the mobile device (for example, by verifying whether the mobile device is in proximity of the access point or it is within the maximum distance from the GPS coordinates of the corresponding installation area). If the selection condition is fulfilled (i.e., the mobile device is within the installation area), the blocks 420-442 are executed, whereas on the contrary (i.e., the mobile device is outside the installation area) the blocks 444-460 are executed; in both cases, the flow of activity merges again at block 462.

With reference in particular to the block 420 (selection condition fulfilled), a test is made to verify whether the (selected) app is already installed on the mobile device (as indicated in the app register). If not, (i.e., its identifier is not comprised in the app register), the status of each resource of the mobile device indicated in the installation rules is discovered at block 422. Continuing to block 424, the corresponding installation rules are verified against the status of these resources of the mobile device (for example, by verifying whether its battery level or available mass memory space is (possibly strictly) higher than the corresponding threshold). If the installation rules are not fulfilled, the flow of activity directly descends into the block 462 (and then no action is performed). Conversely, an indication of the features of the app is downloaded at block 426 onto the mobile device (from the corresponding link indicated in the local list), for example, after establishing a connection with the corresponding access point. Continuing to block 428, the corresponding installation rules are verified against the features of the app (for example, by verifying whether the app occupies a mass memory space (possibly strictly) lower than the corresponding threshold and whether its identifier is not included in the black list). If these installation rules are not fulfilled, the flow of activity directly descends into the block 462 (and then no action is performed).

Conversely (i.e., when all the installation rules are fulfilled), the installation package of the app is downloaded at block 430 onto the mobile device (from the same link indicated in the local list), for example, through the connection with the corresponding access point already established. The app is then installed into the container of the mobile device at block 432 by applying its installation package; the installation is performed in a silent mode, by automatically granting all the authorizations requested by the app. In this way, the installation does not require any manual intervention by the user (so that it is completely opaque to him/her); however, at the same time this does not expose the mobile device to security concerns, since the access to the resources of the mobile device is controlled by the container wherein the app is installed. Once the installation of the app has been completed, the user is notified accordingly (for example, in a notification drawer). A test is then made at block 434 to verify whether user's data is stored for the app in the app data repository. If so, the user's data is restored into the app at block 436; in this way, the app is returned to its condition before the previous removal thereof (so that this removal is completely opaque to the user). The flow of activity then descends into the block 462; the same point is also reached directly from the block 434 when no user's data for the app is available in the app data repository (and then no action is performed).

Referring back to the block 420, if the app is already installed on the mobile device (i.e., its identifier is comprised in the app register), the de-selection timestamp of the app (indicating when the app has been de-selected previously, if available) is deleted from the app data repository at block 438. A further test is made at block 440 to verify whether the app is enabled (as indicated in the app data repository, for example, by a corresponding enable flag). If not (i.e., the enable flag is deasserted), the app is enabled at block 442 by asserting its enable flag. The flow of activity then descends into the block 462; the same point is also reached directly from the block 440 when the app is already enabled (and then no action is performed).

With reference instead to the block 444 (selection condition non-fulfilled), a test is again made to verify whether the app is installed on the mobile device. If not (i.e., its identifier is not comprised in the app register), the flow of activity directly descends into the block 462 (and then no action is performed). Conversely, when the app is installed on the mobile device (i.e., its identifier is comprised in the app register) a further test is made at block 446 to verify whether the app is enabled. If so (i.e., the enable flag is asserted), a still further test is made at block 448 to verify whether the de-selection timestamp of the app is available (in the app data repository). If not, meaning that the app has not been de-selected previously, its de-selection timestamp is set to the current time and it is added to the app data repository at block 450; the flow of activity then descends into the block 462. Referring back to the bock 448, if instead the de-selection timestamp of the app is available (meaning that it has already been de-selected previously), a test is made at block 452 to verify whether a disabling interval (defined in the removal rules, for example, 5-10 min.) from the de-selection timestamp has expired. If so (meaning that the app has remained de-selected for the disabling interval), the app is disabled at block 454 (by de-asserting the corresponding enable flag in the app data repository). The flow of activity then descends into the block 462; the same point is also reached directly from the block 452 when the disabling interval has not expired yet (and then no action is performed). In this way, it is possible to maintain the temporary app enabled even if the user has left the corresponding selection area for a short time; conversely, when the user has left the selection area for a longer time, the app is disabled so as to make it invisible to the user (but without actually uninstalling it).

Referring back to the block 446, if the app is disabled (i.e., the enable flag is deasserted), a test is made at block 456 to verify whether an uninstalling interval (defined in the removal rules to be always higher than the disabling interval, for example, 30-90 min) from the de-selection timestamp (always available in this case) has expired. If so, the user's data of the app (as defined in the removal rules) is saved into the app data repository at block 458 (if available). The app is then uninstalled from the container of the mobile device at block 460. The flow of activity descends into the block 462; the same point is also reached directly from the block 456 when the uninstalling interval has not expired yet (and then no action is performed). In this way, it is possible to avoid continual installation and uninstallation of the app when the user moves in and out the corresponding selection area.

With reference now to the block 462, a test is made to verify whether all the apps indicated in the local list have been processed. If not, the flow of activity returns to the block 414 to repeat the same operations for a next app of the local list. Conversely, after a last app of the local list has been processed the flow of activity returns to the block 412 waiting for a next detection of the position of the mobile device.

In a completely independent way, the flow of activity enters block 464 whenever the user submits a reset command for the container of the temporary apps (through the user interface). In response thereto, the container is reset at block 466; as a result, all the temporary apps installed therein are uninstalled from the mobile device (and the corresponding app data in the app data repository is deleted). In this way, it is possible to restore the normal operation of the mobile device (without any temporary app) in a simple and fast way, without any risk of damaging the standard apps installed thereon.

Modifications

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any entity or structure suitable for carrying out the relevant function.

For example, an embodiment provides a method for installing software applications on a mobile computing device. The method comprises the following steps. A position of the mobile computing device is monitored. One or more software applications available to be installed on the mobile computing device are selected according to the position of the mobile computing device. The selected software applications are installed in a container of the mobile computing device; the container provides an execution environment for the selected software applications with controlled access to one or more resources of the mobile computing device.

However, the mobile computing device may be of any type (see below). The software applications may be of any type (for example, widgets displaying auto-updating contents) and they may be used for any purpose (for example, augmented reality at touristic sites). The position of the mobile computing device may be monitored in any way (for example, according to a cell to which the mobile computing device is connected or according to any other message that is broadcast by any fixed infrastructure based on any technology, such as Bluetooth) and at any time (for example, periodically or only when a corresponding message is received). The software applications may be selected in any way according to the position of the mobile computing device (for example, only after the mobile computing device remains in the corresponding installation area for a time longer than a threshold). The selected software applications may be installed in any way (see below). The selected software applications may be installed in any type of container, which implements any control of the access to any type and number of resources of the mobile computing device; for example, the container may only restrict any access (for example, read/write or only write) to any resource (for example, user's identity), it may only limit any use (for example, when it is not required by the standard apps, during selected periods) of any resource (for example, memory space, Internet connection), or both of them.

In an embodiment, said installing the selected software applications comprises installing the selected software applications in a silent mode by accepting each authorization request to access the resources of the mobile computing device by the selected software applications.

However, the installation may require some manual intervention by the user (for example, to grant specific authorizations).

In an embodiment, the method further comprises defining one or more control policies, and configuring the container to limit the access to the resources of the mobile computing device according to the control policies.

However, the control policies may be defined in any way (for example, by downloading them onto the mobile computing device); in any case, a simple implementation is not excluded wherein the container limits the access to the resources of the mobile device in a pre-defined way.

In an embodiment, the method further comprises receiving a reset command; the container is reset, thereby removing the selected software applications installed on the mobile computing device, in response to the reset command.

However, the reset command may be received in any way (for example, requiring a user's password); moreover, the container may be reset in any way (for example, with the possibility of selecting the software applications to be removed). In any case, this feature may also be omitted in a simplified implementation (wherein the software applications may only be removed individually).

In an embodiment, the method further comprises storing a local list of the software applications on the mobile computing device; for each software application the local list comprises an indication of a selection condition based on the position of the mobile computing device. Said selecting one or more software applications comprises selecting the software applications whose selection condition is fulfilled by the position of the mobile computing device.

However, the local list may be of any type (for example, a file or a data-base); particularly, each selection condition may be of any type (for example, defined by one or more statements, each one identifying a corresponding selection area in any way, for example, a city, a region, a state). In any case, the local list is suitable to be used (alone or in combination with any other additional feature) even without the container described above; vice-versa, the possibility of selecting the software applications remotely is not excluded.

In an embodiment, said storing a local list comprises synchronizing the local list with at least one remote list.

However, the local list may be synchronized with any number of remote lists in any way (for example, with portions thereof stored at different locations) and at any time (for example, periodically or only when a corresponding command is received).

In an embodiment, the method further comprises defining one or more installation rules, and enabling the installation of the selected software applications according to the installation rules.

However, the installation rules may be defined in any way (for example, by downloading them onto the mobile computing device), and they may be in any number and of any type (see below). In any case, a simple implementation is feasible wherein the installation of the selected software applications is conditioned in other ways (for example, according to a user's confirmation) or it is not conditioned at all.

In an embodiment, at least part of the installation rules are based on one or more features of the software applications. Said enabling the installation of the selected software applications comprises the following steps. An indication of the features of each selected software application is downloaded onto the mobile computing device; the installation of each selected software application whose features fulfill the installation rules is enabled.

However, the features may be of any type (for example, category, required authorizations) and their indication may be downloaded in any way (for example, already included in the local list).

In an embodiment, at least part of the installation rules are based on a status of one or more selected resources of the mobile computing device. Said enabling the installation of the selected software applications comprises the following steps. The status of the selected resources is determined; the installation of the selected software applications is enabled in response to the status of the selected resources fulfilling the installation rules.

However, the selected resources may be of any type (for example, working memory usage) and their status may be defined and measured in any way (for example, by combining multiple metrics provided by different sources into a single index).

More generally, the installation rules may only be based on the features of the software applications, on the resources of the mobile computing device, on both of them, or on any other criteria (for example, a time window).

In an embodiment, the method further comprises the following steps. One or more of the selected software applications installed on the mobile computing device are de-selected according to the position of the mobile computing device; the de-selected software applications are removed from the mobile computing device.

However, the software applications may be de-selected and removed in any way (see below); in any case, a simple implementation is not excluded wherein the software applications are always left installed on the mobile computing device (for example, for the periodical removal of the software applications that are not used by more than a pre-defined time).

In an embodiment, the method further comprises defining one or more removal policies; said removing the de-selected software applications from the mobile computing device comprises removing the de-selected software applications from the mobile computing device according to the removal policies.

However, the removal policies may be in any number and of any type (see below); in any case, the simple removal of any software application as soon as it is de-selected is feasible.

In an embodiment, said removing the de-selected software applications comprises the following steps. Each de-selected software application is disabled in response to the de-selected software application remaining deselected for a disabling interval; each disabled software application is uninstalled in response to the disabled software application remaining disabled for an uninstalling interval. The method further comprises enabling each disabled software application in response to the selection of the disabled software application within the uninstalling interval.

However, the disabling interval and the uninstalling interval may have any value (with the uninstalling interval that may be defined either from the de-selection or from the disabling of the software application). In any case, the removal of the software applications may be controlled in any other way (for example, with the immediate disabling but a delayed uninstalling, with a simple uninstalling without any disabling, either immediate or delayed).

In an embodiment, the method further comprises saving application data associated with each de-selected software application before the removing thereof, and restoring the application data associated with each selected software application after the installing thereof.

However, any application data may be saved and restored (for example, configuration information, user's preferences); moreover, the saving and the restoring of the application data may be implemented in any way (for example, by requesting the user to select the application data to be saved and/or restored, by discarding the saved application data when it is older than a threshold). In any case, a simple implementation is feasible wherein no application data of the software application to be removed is saved.

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program, which is configured for causing a computing system to perform the above-mentioned method when the computer program is executed on the computing system. A further embodiment provides a computer program product, which comprises a non-transitory computer readable medium embodying a computer program; the computer program is loadable into a working memory of a computing system thereby configuring the computing system to perform the same method.

However, the computer program may be implemented as a stand-alone module, as a plug-in for an operating system, or even directly in the latter; moreover, it is also possible to deploy the same solution as a service that is accessed through a network (such as in the Internet). As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment provides a system, which comprises means configured for performing the steps of the above-mentioned method.

However, the system may be of any type (for example, a netbook).

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The invention claimed is:

1. A method for installing software applications on a mobile computing device, the method comprising:
    monitoring, by the mobile computing device, a position of the mobile computing device;
    selecting, by the mobile computing device, from a local list stored in the mobile computing device, one or more software applications available to form selected software applications to be installed as temporary applications and executed on the mobile computing device according to the position of the mobile computing device;
    defining, by the mobile computing device, one or more control policies that set a usage threshold limiting usage of processing power and network bandwidth of the mobile computing device by the selected software applications to be installed as the temporary applications;
    configuring, by the mobile computing device, a dedicated container of the mobile computing device according to the one or more control policies to limit the usage by the temporary applications in an internal execution environment of the dedicated container to the processing power and the network bandwidth in an external execution environment of the mobile computing device that is outside of the internal execution environment based on the limit set by the usage threshold; and
    installing, by the mobile computing device, the selected software applications as the temporary applications in the dedicated container of the mobile computing device providing the internal execution environment for the temporary applications with controlled access by the temporary applications within the dedicated container to the processing power and the network bandwidth in the external execution environment of the mobile computing device to limit the usage of the processing power and the network bandwidth in the external execution environment by the temporary applications executing in the internal execution environment of the dedicated container based on the usage threshold set by the one or more control policies.

2. The method according to claim 1, wherein said installing, by the mobile computing device, the selected software applications as the temporary applications in the dedicated container comprises:
    installing, by the mobile computing device, the selected software applications as the temporary applications in the dedicated container in a silent mode in response to the mobile computing device accepting from the selected software applications each authorization request to access resources in the external execution environment of the mobile computing device that are outside of the internal execution environment of the dedicated container.

3. The method according to claim 1, further comprising:
receiving, by the mobile computing device, a reset command; and
resetting, by the mobile computing device, the dedicated container thereby removing the selected software applications installed as the temporary applications within the dedicated container and deleting, by the mobile computing device, corresponding application data from an application data repository within the dedicated container from the mobile computing device in response to receiving the reset command.

4. The method according to claim 1, further comprising:
storing, by the mobile computing device, the local list of the software applications installed as the temporary applications on the mobile computing device, for each software application the local list comprises a record for a respective software application that is available to be installed as a corresponding temporary application on the mobile computing device, wherein the record comprises an indication of a selection condition based on the position of the mobile computing device and a link to a location from which an indication of features of the respective software application and a corresponding installation package are to be downloaded; and
said selecting, by the mobile computing device, the one or more software applications comprises:
selecting, by the mobile computing device, the one or more software applications whose selection condition is fulfilled by the position of the mobile computing device.

5. The method according to claim 4, wherein said storing, by the mobile computing device, the local list comprises:
periodically synchronizing, by the mobile computing device, the local list stored in the mobile computing device with at least one corresponding remote list when a newer version of the at least one corresponding remote list is available on an installation server by downloading a corresponding delta package that is applied to the local list.

6. The method according to claim 1, further comprising:
defining, by the mobile computing device, one or more installation rules that set a battery level threshold preventing installation of the selected software applications as the temporary applications on the mobile computing device when a battery level of the mobile computing device is lower than the battery level threshold; and
enabling, by the mobile computing device, the installation of the selected software applications as the temporary applications on the mobile computing device in response to the battery level of the mobile computing device being greater than the battery level threshold set by the one or more installation rules.

7. The method according to claim 6, wherein at least part of the one or more installation rules is based on one or more features of the software applications, said enabling, by the mobile computing device, the installation of the selected software applications as the temporary applications on the mobile computing device comprises:
downloading, by the mobile computing device, an indication of features of each selected software application from a corresponding link indicated in the local list on the mobile computing device;
verifying, by the mobile computing device, the at least part of the one or more installation rules against the one or more features; and
enabling, by the mobile computing device, installation of each selected software application whose features fulfill the at least part of the one or more installation rules.

8. The method according to claim 6, wherein at least part of the one or more installation rules is based on a status of one or more selected resources of the mobile computing device, said enabling, by the mobile computing device, the installation of the selected software applications as the temporary applications on the mobile computing device comprises:
determining, by the mobile computing device, the status of the one or more selected resources;
verifying, by the mobile computing device, the at least part of the one or more installation rules against a status of resources of the mobile computing device indicated in the at least part of the one or more installation rules; and
enabling, by the mobile computing device, the installation of the selected software applications installed as the temporary applications on the mobile computing device in response to the status of the one or more selected resources fulfilling the at least part of the one or more installation rules.

9. The method according to claim 1, further comprising:
de-selecting, by the mobile computing device, one or more of the selected software applications installed as the temporary applications on the mobile computing device according to the position of the mobile computing device to form de-selected temporary applications; and
removing, by the mobile computing device, the de-selected temporary applications from the mobile computing device.

10. The method according to claim 9, further comprising:
defining, by the mobile computing device, one or more removal policies; and
said removing, by the mobile computing device, the de-selected temporary applications from the mobile computing device comprises:
removing, by the mobile computing device, the de-selected temporary applications from the mobile computing device according to the one or more removal policies.

11. The method according to claim 9, wherein said removing, by the mobile computing device, the de-selected temporary applications on the mobile computing device comprises:
disabling, by the mobile computing device, each de-selected temporary application in response to a de-selected temporary application remaining de-selected for a disabling time interval greater than a defined disabling time interval threshold by de-asserting a corresponding enable flag in an application data repository;
uninstalling, by the mobile computing device, each disabled temporary application in response to a disabled temporary application remaining disabled for an uninstalling time interval greater than a defined uninstalling time interval threshold that is greater than the defined disabling time interval threshold; and
the method further comprising:
enabling, by the mobile computing device, each disabled temporary application in response to selection of a disabled temporary application within the uninstalling time interval.

12. The method according to claim 9, further comprising:
saving, by the mobile computing device, application data associated with each de-selected temporary application in an application data repository stored within the dedicated container wherein the application data repository saves application data of temporary applications that have been de-selected before the removing thereof; and
restoring, by the mobile computing device, the application data associated with each de-selected temporary application from the application data repository after the installing thereof.

13. A computer program product for installing software applications on a mobile computing device, the computer program product comprising a non-transitory computer readable medium embodying computer readable program code that when executed on the mobile computing device directs the mobile computing device to:
monitor, by the mobile computing device, a position of the mobile computing device;
select, by the mobile computing device, from a local list stored in the mobile computing device, one or more software applications available to form selected software applications to be installed as temporary applications and executed on the mobile computing device according to the position of the mobile computing device;
define, by the mobile computing device, one or more control policies that set a usage threshold limiting usage of processing power and network bandwidth of the mobile computing device by the selected software applications to be installed as the temporary applications;
configure, by the mobile computing device, a dedicated container of the mobile computing device according to the one or more control policies to limit the usage by the temporary applications in an internal execution environment of the dedicated container to the processing power and the network bandwidth in an external execution environment of the mobile computing device that is outside of the internal execution environment based on the limit set by the usage threshold; and
install, by the mobile computing device, the selected software applications as the temporary applications in the dedicated container of the mobile computing device providing the internal execution environment for the temporary applications with controlled access by the temporary applications within the dedicated container to the processing power and the network bandwidth in the external execution environment of the mobile computing device to limit the usage of the processing power and the network bandwidth in the external execution environment by the temporary applications executing in the internal execution environment of the dedicated container based on the usage threshold set by the one or more control policies.

14. A mobile computing device for installing software applications on the mobile computing device, the mobile computing device comprising:
a memory having computer readable program code stored therein;
a data processor coupled to the memory, wherein the data processor executes the computer readable program code to:
monitor a position of the mobile computing device;
select from a local list stored in the mobile computing device, one or more software applications available to form selected software applications to be installed as temporary applications on the mobile computing device according to the position of the mobile computing device;
define one or more control policies that set a usage threshold limiting usage of processing power and network bandwidth of the mobile computing device by the selected software applications to be installed as the temporary applications;
configure a dedicated container of the mobile computing device according to the one or more control policies to limit the usage by the temporary applications in an internal execution environment of the dedicated container to the processing power and the network bandwidth in an external execution environment of the mobile computing device that is outside of the internal execution environment based on the limit set by the usage threshold; and
install the selected software applications as the temporary applications in the dedicated container of the mobile computing device providing the internal execution environment for the temporary applications with controlled access by the temporary applications within the dedicated container to the processing power and the network bandwidth in the external execution environment of the mobile computing device to limit the usage of the processing power and the network bandwidth in the external execution environment by the temporary applications executing in the internal execution environment of the dedicated container based on the usage threshold set by the one or more control policies.

* * * * *